United States Patent
Correa et al.

(10) Patent No.: US 10,992,669 B2
(45) Date of Patent: Apr. 27, 2021

(54) ACQUISITION OF A DEVICE FINGERPRINT FROM AN INSTANCE OF A CLIENT APPLICATION

(71) Applicant: Hewlett-Packard Development Company, L.P., Houston, TX (US)

(72) Inventors: Victor Albuquerque Correa, Sunnyvale, CA (US); Humberto Cardoso Marchezi, Porto Alegre (BR); Roberto Bender, Porto Alegre (BR); Joao Carrion, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 327 days.

(21) Appl. No.: 15/518,455

(22) PCT Filed: Apr. 28, 2015

(86) PCT No.: PCT/US2015/027982
§ 371 (c)(1),
(2) Date: Apr. 11, 2017

(87) PCT Pub. No.: WO2016/175761
PCT Pub. Date: Nov. 3, 2016

(65) Prior Publication Data
US 2017/0310667 A1    Oct. 26, 2017

(51) Int. Cl.
*H04W 12/06* (2021.01)
*H04L 9/32* (2006.01)
(Continued)

(52) U.S. Cl.
CPC .......... *H04L 63/0876* (2013.01); *G06F 21/35* (2013.01); *H04L 9/3239* (2013.01);
(Continued)

(58) Field of Classification Search
CPC ... H04L 63/0876; H04L 9/3239; H04L 63/08; H04L 63/10; H04L 63/102; G06F 21/35; H04W 12/06
See application file for complete search history.

(56) References Cited

U.S. PATENT DOCUMENTS

| 6,374,359 B1 | 4/2002 | Shrader et al. |
| 7,222,162 B2 | 5/2007 | Lee et al. |

(Continued)

FOREIGN PATENT DOCUMENTS

| CN | 103425921 | 12/2013 |
| CN | 103780397 | 5/2014 |

(Continued)

OTHER PUBLICATIONS

Loh et al "Identifying Unique Devices through Wireless Fingerprinting," WiSec '08, Mar. 31-Apr. 2, 2008, pp. 46-55 (Year: 2008).*

(Continued)

*Primary Examiner* — Luu T Pham
*Assistant Examiner* — James J Wilcox
(74) *Attorney, Agent, or Firm* — HP Inc. Patent Department (57) ABSTRACT

Examples disclosed herein relate to acquisition of a device fingerprint from an instance of a client application. Examples include association of a target device fingerprint, based on device context information, with a target user account in a remote service, and acquisition of an application device fingerprint from an unpaired instance of a client application.

15 Claims, 3 Drawing Sheets

(51) Int. Cl.
  *G06F 21/35* (2013.01)
  *H04L 29/06* (2006.01)
(52) U.S. Cl.
  CPC .............. *H04L 63/08* (2013.01); *H04L 63/10* (2013.01); *H04L 63/102* (2013.01); *H04W 12/0605* (2019.01)

(56) References Cited

U.S. PATENT DOCUMENTS

| | | | |
|---|---|---|---|
| 7,730,179 B2 | 6/2010 | Tanner | |
| 8,205,790 B2* | 6/2012 | Pennella | G06F 21/31 235/375 |
| 8,213,935 B2 | 7/2012 | Jones et al. | |
| 8,392,975 B1 | 3/2013 | Raghunath | |
| 8,620,315 B1 | 12/2013 | Merritt et al. | |
| 8,620,578 B1 | 12/2013 | Brown et al. | |
| 8,627,438 B1* | 1/2014 | Bhimanaik | H04L 63/10 726/9 |
| 8,695,058 B2 | 4/2014 | Batchu et al. | |
| 8,763,154 B2 | 6/2014 | Yin et al. | |
| 8,769,651 B2 | 7/2014 | Grajek et al. | |
| 8,954,560 B2* | 2/2015 | Johannsen | G06F 21/44 709/223 |
| 9,038,159 B2* | 5/2015 | Koonjbearry | H04L 63/1483 726/10 |
| 9,124,583 B1* | 9/2015 | Amaladoss | H04L 63/0884 |
| 2010/0107225 A1* | 4/2010 | Spencer | H04L 63/0876 726/4 |
| 2010/0229224 A1* | 9/2010 | Etchegoyen | G06F 21/31 726/5 |
| 2012/0030576 A1* | 2/2012 | Bell | G06F 21/6263 715/738 |
| 2012/0054841 A1 | 3/2012 | Schultz et al. | |
| 2012/0144034 A1 | 6/2012 | McCarty | |
| 2012/0215896 A1* | 8/2012 | Johannsen | H04L 41/0853 709/223 |
| 2012/0311027 A1* | 12/2012 | Salusky | H04L 63/126 709/203 |
| 2013/0167143 A1 | 6/2013 | Yi | |
| 2013/0282592 A1 | 10/2013 | Zambrana et al. | |
| 2014/0025791 A1* | 1/2014 | Johannsen | H04L 41/0853 709/220 |
| 2014/0299884 A1 | 10/2014 | Park et al. | |
| 2014/0301614 A1 | 10/2014 | Han et al. | |
| 2014/0313983 A1* | 10/2014 | Onno | H04L 63/105 370/328 |
| 2014/0375437 A1 | 12/2014 | Rezvani et al. | |
| 2015/0006384 A1* | 1/2015 | Shaikh | G06Q 20/4016 705/44 |
| 2015/0127825 A1* | 5/2015 | Johannsen | H04L 67/303 709/224 |
| 2015/0237039 A1* | 8/2015 | Grajek | H04L 67/02 726/8 |
| 2015/0237049 A1* | 8/2015 | Grajek | H04L 63/0815 726/7 |
| 2015/0270961 A1* | 9/2015 | Barnett | G06Q 20/4014 713/189 |
| 2015/0271175 A1* | 9/2015 | Je | G06K 9/00979 726/4 |
| 2015/0326574 A1* | 11/2015 | Amaladoss | H04L 63/0876 726/7 |
| 2016/0072737 A1* | 3/2016 | Forster | H04L 51/02 709/206 |
| 2016/0155128 A1* | 6/2016 | Desai | G06Q 20/3227 705/44 |
| 2016/0174072 A1* | 6/2016 | Allyn | H04W 12/06 455/411 |
| 2016/0255088 A1* | 9/2016 | Kaplan | H04L 63/08 726/7 |

FOREIGN PATENT DOCUMENTS

| | | |
|---|---|---|
| CN | 104335524 | 2/2015 |
| EP | 2273438 | 1/2011 |

OTHER PUBLICATIONS

Andrade, "How to Use Apple's Touch ID for Two-factor Authentication," Sep. 12, 2014, <https://www.secsign.com/use-apples-touch-id-two-factor-authentication/>.
Anonymous, "Cross-browser fingerprinting test 2.0," available Apr. 9. 2015, <http://fingerprint.pet-portal.eu/>, 3 pages.
Chapman, "The Browser Object Model," Apr. 2, 2015, <http://web.archive.org/web/~4 pages.
Conniq.com, "LAN IP Address vs WAN IP Address," Apr. 2, 2015, <http://www.conniq.com/FAQ/lan-wan-ip-address.html>, 3 pages.
Continuityfocus, MobileED—The Best Mobile Security and Content Filtering Available. Period, (Web Page), Nov. 27, 2014, 2 pages.
Doty~"Fingerprinting Guidance for Web Specification Authors," Feb. 24, 2015, <https://w3c.github.io/fingerprinting-guidance/>, 10 pages.
Dropbox, "Dropbox—Download the mobile app", (web page) available Apr. 20, 2015, <https://www.dropbox.com/guide/~6 pages.
Eckersley, "How Unique Is Your Web Browser?," Privacy Enhancing Technologies, 2010, Electronic Frontier Foundation, pp. 1-18.
Eckersley, "Is Every Browser Unique? Results Fom The Panopticlick Experiment," May 17, 2010, Electronic, Frontier Foundation—3 pages.
Electronic Frontier Foundation, "Panopticlick," (web site), available Apr. 6, 2015, <https://panopticlick.eff.org/>, 3 pages.
Gemal, "BrowserSpy.dk," available Apr. 9, 2015, <http://browserspy.dk/>, 3 pages.
Janc et al., "Technical analysis of client identification mechanisms," Oct. 6, 2014, <http://www.chromium.org/Home~12 pages.
Kassner, "BrowserSpy.dk: Reveals more than enough information." Feb. 8, 2010, <http://www.techrepublic.com~12 pages.
Mozilia Wiki, "Fingerprinting," Jan. 7, 2014, <https://wiki.mozilla.org/Fingerprinting>, 7 pages.
Patently Apple, "Apple Patents for Flexible Displays with Bent Edge Regions & Synthetic Sensing Fingerprint Technology Come to Light," Oct. 9, 2014, http://www.patentlyapple.com/~6 pages.
SecureAuth, "Device/Browser Fingerprinting—Heuristic-Base Authentication," Sep. 24, 2015, 9 pages https://docs.secureauth.com/.
Sony Computer Entertainment Inc., "PlayStation® App Connection Settings"—Dec. 23, 2014, 1 page <http://manuals.playstation.net/document/en/ps4/settings/app.html>.
TheGRID, The Issue—Identity Theft, (Web Page), retrieved on Feb. 12, 2015 at http://www.gridelock.com/gridv2/solution_SIT.htm~3 pages.
Wikipedia, "Canvas fingerprinting," Mar. 8, 2015, <http://en.wikipedia.org/wiki/Canvas_fingerprinting>, 4 pages.
Wikipedia. "Password notification email," Oct. 2, 2013, <http://en.wikipedia.org/wiki/Password_notification_email>.~2 pages.
Wikipedia, "Self-service password reset," Feb. 27, 2015, <http//en.wikipedia.org/wiki/Self-service_password_reset>, 4 pages.

\* cited by examiner

ACQUISITION OF A DEVICE FINGERPRINT FROM AN INSTANCE OF A CLIENT APPLICATION

BACKGROUND

A remote service implemented by computing resources accessible via at least one computer network may associate data of users with respective user accounts. For example, a remote service such as a cloud data storage service may associate a user's data with the user's account in the service. In such examples, a user may log in to the service to access the data associated with the user's account.

BRIEF DESCRIPTION OF THE DRAWINGS

The following detailed description references the drawings, wherein.

DETAILED DESCRIPTION

As noted above, using a remote service accessible via computer network(s) may involve logging into a user account to access data in the remote service. In some examples, a remote service, such as a cloud-based data storage service, may provide an associated client application (or "app") to be utilized on a mobile computing device, such as a smartphone, tablet, laptop, or the like. In such examples, after logging into the remote service via a web browser, a user may download a client application for the remote service, and then manually input login credentials associated with the user's account to the client application to access remote service and the user's data in the remote service.

However, manually inputting such credentials may be inconvenient for users, cumbersome to accomplish on a small touchscreen, and the like. As the number of mobile devices used to access such services multiplies, these difficulties may likewise be multiplied for users wishing to use client application instances on multiple different devices.

To address these issues, examples described herein may streamline the client application registration process by associating a device fingerprint for client computing device used to access the remote service with a user account. In some examples described herein, the fingerprint may be used to determine when an unpaired instance of the client application is on the same client computing device that was previously logged in via the web browser. In response to such a determination, examples described herein may pair the instance of the client application on the client computing device with the user account previously logged in via the browser, without user input of account credentials through the downloaded client application.

In examples described herein, a remote service may acquire, from a web browser on a client computing device, login information for a target user account of the remote service, acquire, from the web browser, device context information for the client computing device, and associate a target device fingerprint, based on the acquired device context information, with the target user account in the remote service. In some examples described herein, the remote service may further acquire, from an unpaired instance of a client application, an application device fingerprint determined by the instance of the client application based on device context information for a computing device including the instance of the client application, and may pair the instance of the client application with the target user account based on the acquired application device fingerprint and without user input, in response to a determination that the application device fingerprint matches the target device fingerprint.

In some examples described herein, the target device fingerprint may be based on device context information for a computing device obtained from a web browser on the computing device and used to log in to a target user account. In such examples, the target device fingerprint may represent an identity of the computing device that logged into the target user account with a web browser. In some examples, an application device fingerprint acquired from an instance of a client application may also be based on device context information for the computing device on which the instance is downloaded. In such examples, the application device fingerprint may represent an identity of the computing device on which the instance of the client application is downloaded. In such examples, determining that the application device fingerprint matches the target device fingerprint may indicate that the instance of the client application is downloaded on the computing device that was previously logged into the target user account. In some examples, based on such a match, examples described herein may pair the instance of the client application with the target user account in response to the match and without user input. In this manner, examples described herein may streamline the client application registration process such that an instance of a client application may be paired to a remote service without a user inputting credentials into the downloaded and installed client application instance.

Figure 1:
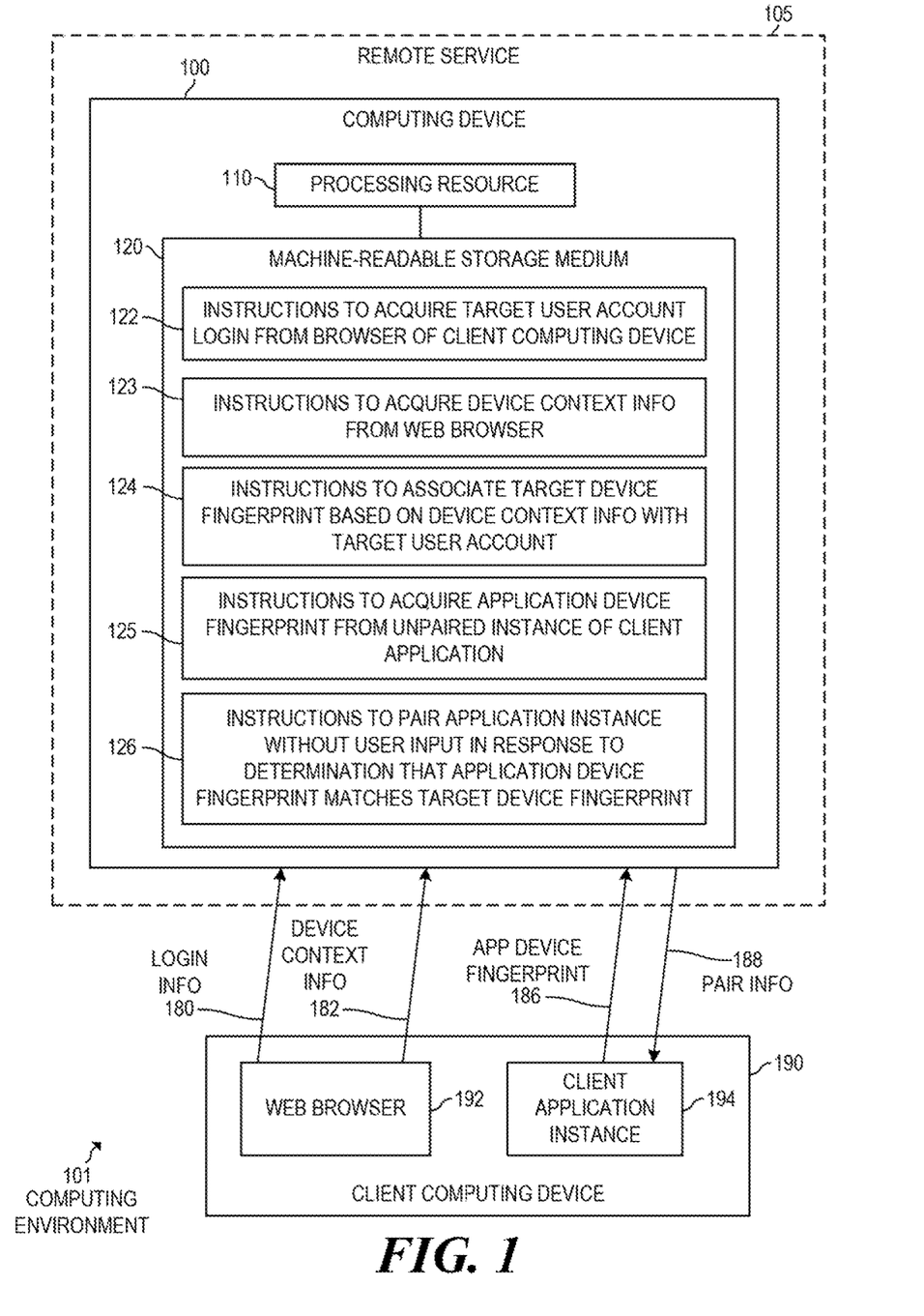
FIG. 1 is a block diagram of an example computing device to pair an instance of a client application with a user account based on an application device fingerprint.

Referring now to the drawings, FIG. 1 is a block diagram of an example computing environment 101 including a computing device 100 to pair an instance 194 of a client application with a user account based on an application device fingerprint. In the example of FIG. 1, computing environment 101 includes a remote service 105 at least partially implemented by at least one computing device, including computing device 100.

Computing device 100 includes a processing resource 110 and a machine-readable storage medium 120 comprising (e.g., encoded with) instructions 122-126. In some examples, storage medium 120 may include additional instructions. In some examples, instructions 122-126, and any other instructions described herein in relation to storage medium 120, may be executable by processing resource 110 and may be stored on a machine-readable storage medium remote from but accessible to computing device 100 and processing resource 110 (e.g., via a computer network). In examples described herein, a processing resource may include, for example, one processor or multiple processors included in a single computing device or distributed across multiple computing devices. As used herein, a "computing device" may be a desktop computer, notebook computer, workstation, tablet computer, mobile phone, smart device (e.g., smartphone), server, blade enclosure, printing device, or any other processing device or equipment.

In examples described herein, a "remote service" may be a service or collection of services implemented by computing device(s) that are separate from, and not directly connected to, client computing devices that may be utilized to access the service(s) via at least one computer network. In the example of FIG. 1, computing device 100 may include at least one network interface device (e.g., such as network interface device 240 illustrated in FIG. 2). In examples described herein, a "network interface device" may be a hardware device to communicate over at least one computer network. In some examples, a network interface may be a network interface card (NIC) or the like. As used herein, a computer network may include, for example, local area network(s) (LAN(s)), wireless local area network(s) (WLAN(s)), virtual private network(s) (VPN(s)), the Internet, telephone network(s) (e.g., cellular telephone network(s)), or the like, or a combination thereof. In examples described herein, computing device 100 of remote service 105 may communicate with client computing device(s) (e.g., client computing device 190 of computing environment 101) via computer network(s) using the at least one network interface device.

In the example of FIG. 1, instructions 122 may acquire, from a web browser 192 on client computing device 190, login information 180 for a target user account of the remote service. For example, web browser 192 may navigate to a login page for remote service 105, and web browser 192 may obtain login information 180 for the target user account (e.g., via user input or from memory of client computing device 190), and provide them to remote service 105. In such examples, instructions 122 may acquire the login information 180 (e.g., credentials), such as a username (e.g., email address) and a password, from web browser 192, determine whether login information 180 is valid (e.g., corresponds to the login information stored by the remote service for a particular user account). When login information 180 is valid, instructions 122 may provide web browser 192 of client computing device 190 with access to remote service 105 and data associated with the target user account associated with the login information 180.

In examples described herein, a computing device, a systems, instructions or engines thereof, or the like, may "acquire" information either actively (e.g., retrieve, etc.) or passively (e.g., receive, etc.). In examples described herein, a "client computing device" may be any type of computing device as described herein, including a mobile computing device, such as a mobile phone, smart device (e.g., smartphone), tablet computer, laptop, or any other type of computing device including a portable energy source (e.g., battery, etc.) capable of powering the device when not connected to an external power source. In examples described herein, a "web browser" or "browser" on a client computing device may be any suitable computer application (i.e., machine-readable instructions) that, when installed on the client computing device, may be executed to, for example, access and navigate web pages (e.g., on the World Wide Web), display contents of web pages on the client computing device, and execute machine-readable instructions of web page(s) (e.g., JAVASCRIPT, etc.), and the like.

In the example of FIG. 1, instructions 123 may acquire device context information 182 for client computing device 190 from web browser 192 of client computing device 190. For example, web browser 192 may collect device context information 182 for client computing device 190 and return it to remote service 105. In some examples, web browser 192 may access a web page of (e.g., served by) remote service 105 containing machine readable instructions that, when executed by web browser 192, cause web browse 192 to collect the device context information 182.

In some examples, a user of computing device 190 may access remote service 105 by navigating web browser 192 of client computing device 190 to a web portal of remote service 105 comprising one or more web pages. In such examples, instructions 122 may acquire the login information 180 from web browser 192, as described above, and the user may be logged into remote service 105 in association with the target user account. In some examples, the user logged in to the target user account may select to download a client application via the web portal of remote service 105. For example, at least one of the web pages served by remote service 105 may provide a link or other element that a user may click or otherwise select, via web browser 192, to download a client application, such as a client application for remote service 105 (i.e., useable to access services of remote service 105, such as a dedicated application for that purpose).

In such examples, in response to selection of the link or other element to download the client application, instructions 123 may acquire device context information 182 from web browser 192. For example, in response to selection of the link (or other element), remote service 105 may serve a web page including machine-readable instructions (e.g., JAVASCRIPT code, or the like) that, when executed by web browser 192, cause the browser to collect piece(s) of device context information from client computing device 190 and return it as device context information 182 to remote service 105.

In examples described herein, device context information 182 may contain one or multiple pieces of device context information. In examples described herein, a piece of "device context information" for a computing device may be a piece of information descriptive of at least one aspect of the computing context of the computing device, including at least the hardware, software, and configuration of the computing device. Examples of pieces of device context information for a computing device include screen width for the computing device (e.g., a string representation of a width value in pixels or any other suitable units, such as "200"), screen height for the computing device (e.g., a string representation of a height value in pixels or any other suitable units, such as "320"), the computing platform type for the computing device (e.g., a string, such as "IPHONE"), local Internet Protocol (IP) address(es) for the computing device (e.g., one or more strings such as "192.168.0.1", etc.), external IP address(es) for the computing device (e.g., one or more strings such as "16.127.74.120", etc.), and the like. In other examples, other suitable pieces of information may be utilized as at least a portion of the device context information.

In some examples described herein, each piece of device context information for a computing device is information accessible both to a web browser (when executing on the computing device) and an instance of a client application (when executing on the computing device). In such examples, each piece of device context information is obtainable both by a web browser on the computing device and an instance of a client application on the computing device. In examples described herein, local IP addresses may be IP addresses used to identify or connect to a computing device within a local area network (LAN) and the internal LAN IP addresses for routers connected to the LAN. In examples described herein, external IP addresses may be IP addresses used to identify or connect to a computing device from outside of a LAN to which the computing device is connected (e.g., the IP address at which a router of the LAN may be accessed from outside of the LAN, such as from the Internet).

In some examples, each individual piece of device context information may be embodied in a suitable string of characters (which may include spaces, etc.). For example, in the example of FIG. 1, web browser 192 may return the following pieces of device context information as device context information 182; a screen width "200", a screen height "320", a platform name "IPHONE", local IP addresses "192.168.0.1" and "16.15.14.13", and external IP address "16.127.74.120". In other examples, device context information may be acquired by instructions 123 in any suitable format.

In the example of FIG. 1, instructions 124 may associate a target device fingerprint, based on the acquired device context information 182, with the target user account in remote service 105. In some examples, instructions 124 may generate a target device fingerprint (such as target device fingerprint 252 illustrated in FIG. 2), based on device context information 182 for client computing device 190 acquired from web browser 192 of client computing device 190. In examples described herein, a "device fingerprint" (which may be referred to as a "device context fingerprint") of a computing device is information representing at least one aspect of a computing context of the computing device. In some examples, a device fingerprint may be generated based on device context information, or may otherwise include a collection of information based on device context information.

As one example, instructions 124 may generate a target device fingerprint by concatenating the strings of device context information 182 (in a defined order) and then applying a hash function to the result. For example, instructions 124 may concatenate the pieces of device context information 182 as a pipe-separated string, such as <external IP>|<width>|<height>|<patform>|<local IPs>. In such examples, instructions 124 may generate the following concatenated string from the example pieces of device context information described above: "16.127.74.120|200|320|IPHONE|192.168.0.1|16.15.14.13". In some examples, instructions 124 may apply any suitable hash function to the concatenated string to generate a target device fingerprint. For example, continuing the above example, instructions 124 may apply the SHA-1 hash function to the concatenated string "16.127.74.120|200|320|IPHONE|192.168.0.1|16.15.14.13" to obtain a different string as the target device fingerprint (e.g., "735570ddf460ce0a0469448987becb84befa719"). In such examples, the target device fingerprint may be embodied as a single string. In such examples, each device fingerprint utilized by remote service 105 may be embodied as a respective string. In some examples, a hash function may be applied to the concatenated string to obfuscate the device context information in the string for security purposes, for example, or to shorten the length of the resulting fingerprint, or both. In such examples, any suitable technique may be applied to process the concatenated string to obfuscate the information, shorten the string, or both. Examples of other techniques that may be applied include encrypting the concatenated string or otherwise encoding the concatenated string according to a suitable format or technique. In other examples, instructions 124 may omit the hashing, encrypting, or other encoding of the concatenated string, and treat the concatenated string as the device fingerprint.

Although one example technique for concatenating device context information into a single string is described above, in examples described herein, instructions 124 may generate a single string from the pieces of device context information 182 in any suitable manner in the generation of the target device fingerprint. For example, instructions 124 may concatenate the pieces of device context information 182 in any suitable manner, or may format the information as a string according to the JAVASCRIPT Object Notation (JSON) format or any other suitable format. In other examples, more pieces of device context information, fewer pieces of device context information, different pieces of device context information, or a combination thereof, may be acquired by instructions 123 from web browser 192 as device context information 182 and utilized by instructions 124 to generate the target device fingerprint. In some examples, instructions 124 may normalize piece(s) of device context information 182 as appropriate prior to generating the target device fingerprint based on the normalized information.

In such examples, after instructions 124 generate the target device fingerprint, instructions 124 may associate the target device fingerprint with the target user account in remote service 105 in any suitable manner. In some examples, remote service 105 may include or otherwise have access to an account repository (e.g., database, or the like) including user account information, such as login information and the like, for each user account for remote service 105. In such examples, instructions 124 may associate the target device fingerprint with the target user account in the account repository of remote service 105 (e.g., as illustrated for target device fingerprint 252 and account repository 230 illustrated in FIG. 2). For example, instructions 124 may store the target device fingerprint as part of the collection of information stored in association with the target user account. In examples described herein, an account repository may be at least partially implemented by at least one machine-readable storage medium to store the information contained in the account repository.

In the example of FIG. 1, instructions 125 may acquire, from an unpaired instance 194 of a client application, an application device fingerprint 186 determined by the instance 194 of the client application based on device context information for client computing device 190 including the instance 194 of the client application. In examples described herein, a client application (and each instance thereof) may be a computer application implemented at least in part by machine-readable instructions, and executable by a computing device (e.g., client computing device 190).

In such examples, instructions 125 may acquire the application device fingerprint 186 from the instance 194 of the client application, after the instance 194 has been downloaded on client computing device 190. As noted above, in some examples, the user logged in to the target user account may select to download a client application via the web portal of remote service 105. In response to selection of a link (or other element) to download the client application, remote service 105 may serve a web page including machine-readable instructions to cause the browser to collect piece(s) of device context information from client computing device 190 and return it as device context information 182 to remote service 105. In such examples, after web browser 192 provides the device context information 182, the web page may then enable the client computing device 190 to download an instance of the client application in any suitable manner.

For example, the web page may redirect web browser 192 to another web page at which an Instance of the client application may be downloaded to client computing device 190, either after web browser 192 provides the device context information 182 to remote service 105 or after remote service 105 acknowledges to web browser 192 that device context information 182 has been received and processed (e.g., a device fingerprint successfully generated), for example (as implemented in the served web page). In some examples, the acknowledgement may also contain the uniform resource locator (URL) to which to redirect web browser 192 to download an instance of the client application. In other examples, the web page may itself contain a link (or other element) to trigger downloading of an instance of the client application, or may itself trigger downloading of an instance of the client application to client computing device 190. For example, the web page may trigger the downloading, either after web browser 192 provides the device context information 182 to remote service 105 or after remote service 105 acknowledges to web browser 192 that device context information 182 has been received and processed (e.g., a device fingerprint successfully generated).

In some examples, after downloading instance 194 of the client application, client computing device 190 may install instance 194 of the client application (e.g., automatically or in response to user input). The downloaded instance 194 of the client application may be an unpaired instance of the client application. In examples described herein, to "pair" an instance of the client application is to associate the instance of the client application with a given user account of the remote service such that the instance of the client application is able to access the remote service in association with the given user account (i.e., to access the remote service and the Information associated with the given user account) without prompting a user of the instance of the client application to enter any login information or credential(s). In examples described herein, an "unpaired" instance of a client application is an instance that has not been paired with any user account of a remote service, and a "paired" instance of a client application is an instance that has been paired with a user account of a remote service.

In some examples, either during the installation process, or when the instance 194 of the client application is run after the installation process (e.g., the first time the instance is run after installation), the instance 194 of the client application may collect device context information 182 from client computing device 190, including the same pieces of device context information 182 previously collected by web browser 192, as described above. For example, as described above, each piece of device context Information 182 for computing device 190 may be information accessible both to web browser 192 and the instance 194 of the client application on client computing device 190. In such examples, web browser 192 and client application instance 194 may obtain the same device context information 182 from client computing device 190.

In such examples, after collecting device context information 182 from client computing device 190, instance 194 of the client application may provide, to remote service 105, an application device fingerprint 186 based on the device context information 182. In some examples, the instance 194 of the client application may determine application device fingerprint 186, based on device context information 182, in the same manner as instructions 124 determine a fingerprint from device context information, to facilitate comparison of the application device fingerprint 186 with other fingerprints generated by instructions 124 for various user accounts. For example, in examples in which instructions 124 generate the target device fingerprint by concatenating the strings of device context information 182 (in a defined order) and then applying a hash function to the result, instance 194 of the client application may generate the application device fingerprint 186 based on device context information 182 in the same manner, and then provide the fingerprint 186 to remote service 105. In some examples, instance 194 may collect device context information 182 and provide application device fingerprint 186 to remote service 105 without user input after the initiation of the installation of the instance 194 of the client application on client computing device 190. In other examples, instance 194 may collect device context information 182 and provide application device fingerprint 186 to remote service 105 without user input after the initiation of the downloading of the instance 194 of the client application to client computing device 190.

In the example of FIG. 1, instructions 125 may acquire the application device fingerprint 186 determined and provided by the unpaired instance 194 of the client application, as described above. In such examples, instructions 126 may compare application device fingerprint 186 to device fingerprints associated with user accounts of remote service 105 to determine whether the application device fingerprint 186 matches any device fingerprint stored in an account repository in association with a respective user account of remote service 105. For example, instructions 126 may compare application device fingerprint 186 to device fingerprints associated with respective user accounts for remote service 105 (which may be stored in the account repository described above) until a device fingerprint that matches the application device fingerprint 186 is found, or until it is determined that none of the stored device fingerprints associated with respective user accounts matches application device fingerprint 186.

In examples in which each device fingerprint is a single string, as described above, then instructions 126 may determine that two device fingerprints match when those two device fingerprints are the same (e.g., identical, contain the same sequence of characters, etc.).

In the example of FIG. 1, based on the comparison(s), instructions 126 may determine that application device fingerprint 186 matches the target device fingerprint determined based on the device context information 182 acquired from the web browser 192, as described above. In such examples, in response to a determination that application device fingerprint 186 matches the target device fingerprint, instructions 126 may pair the instance 194 of the client application with the target user account based on the acquired application device fingerprint and without user input. In such examples, instructions 126 may pair the instance 194 of the client application with the target user account, based application device fingerprint 186 (e.g., based on the match between the application device fingerprint 186 and the target device fingerprint), and without user input of any login information to the instance 194 of the client application on client computing device 190.

In such examples, a user of client computing device 190 may provide user input to select to install (or download) the instance 194 of the client application, and in response, instructions 125 may acquire application device fingerprint 186 from instance 194 and determine that application device fingerprint 186 matches the target device fingerprint. In response to the determination, instructions 126 may pair the instance 194 with the target user account, all without any further user input after the input to select to install (or download) the instance 194 of the client application (e.g., without user input of login information or credentials into an instance 194 of the client application).

In some examples, to pair the instance 194 of the client application with the target user account, instructions 126 may provide, to the instance 194 of the client application, at least one piece of information 188 associated with the target user account in the remote service 105. For example, the at least one piece of information may include a username, email address, or the like, associated with the target user account. In such examples, upon receiving the at least one piece of information associated with the target user account, the instance 194 of the client application may be considered to be paired with the target user account of remote service 105. In such examples, the paired instance 194 of the client application may utilize the at least one piece of information associated with the target user account to identify the paired instance 194 to remote service 105 to gain access to or otherwise communicate with remote service 105 in association with the target user account (e.g., may user the at least one piece of information in communication(s) with remote service 105). For example, paired instance 194 may include the at least one piece of information in request(s) to remote service 105, or to establish, re-establish, maintain, etc., a session with remote service 105 using the at least one piece of information associated with the target user account to thereby enable communication between instance 194 and remote service 105.

In other examples, application device fingerprint 186 may not match any device fingerprint stored in association with any user account of remote service 105. In such examples, in response to a determination by instructions 126 that application device fingerprint 186 does not match any of a plurality of device fingerprints associated with user accounts of remote service 105, instructions 126 may provide, to instance 194 of the client application, information to cause instance 194 to display a prompt for input of login information for remote service 105 via client computing device 190. In such examples, instance 194 of the client application may have been downloaded by a computing device that was not previously used to log in to remote service 105 via a web browser, as described above, and as such may not have a corresponding device fingerprint associated therewith stored in association with a user account of remote service 105. In such examples, when no match is found, instructions 126 may return, to instance 194, an error message or other communication that instance 194 may understand as an indication that instance 194 is to display a prompt for input of login information for remote service 105 via client computing device 190. In such examples, instance 194 may receive the login information, and provide it to remote server 105 to pair instance 194 with the user account associated with the provided login information. In some examples, instance 194 of the client application may be an instance of a client application for remote service 105 (i.e., a dedicated application for use in accessing remote service 105).

In examples described above, a device fingerprint may be a single string (e.g., generated by concatenation and hashing of piece(s) of device context information, or in any other suitable manner as described above). In other examples, a device fingerprint may comprise a plurality of separate strings, each representing a different piece of device context information for a computing device. In such examples, instructions 124 may not generate a single string as a device fingerprint. Instead, in such examples, instructions 124 may associate each piece of device context information 182 acquired from web browser 192 with the target user account (i.e., the user account which has been logged into via web browser 192) as the target device fingerprint collectively. In such examples, the pieces of device context information 182 may be associated with the target user account in any suitable manner.

In such examples, application device fingerprint 186 acquired from instance 194 by instructions 125 may comprise a plurality of separate strings, each representing a different pieces of device context information for client computing device 190. In such examples, instructions 126 may determine that two device fingerprints match when there is an exact match between each of the separate strings of the two device fingerprints. In other examples, instructions 125 may determine that two device fingerprints match when there is at least a partial match of their respective pieces of device context information.

For example, instructions 126 may attempt to match individual pieces of device context information of device fingerprints. In such examples, instructions 126 may determine that there is a match between an application device fingerprint and a given device fingerprint associated with a user account when one or more pieces of device context information of the application device fingerprint (but fewer than all of the pieces of device context information) match corresponding pieces of device context information of the given device fingerprint and do not match corresponding pieces of device context information for any other device fingerprint associated with any other user account, and as such uniquely match with the given device fingerprint. In some examples described herein, the pieces of device context information may be normalized as appropriate when included as part of a device fingerprint (and prior to comparison of device fingerprints).

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may include one processor or multiple processors. Processing resource 110 may fetch, decode, and execute instructions stored on storage medium 120 to perform the functionalities described above. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, one or more machine-readable storage medium or media may be part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution.

In some examples, instructions 122-126 may be part of an installation package that, when installed, may be executed by processing resource 110 to implement the functionalities described herein in relation to instructions 122-126. In such examples, storage medium 120 may be a portable medium, such as a CD, DVD, or flash drive, or a memory maintained by a server from which the installation package can be downloaded and installed. In other examples, instructions 122-126 may be part of an application, applications, or component already installed on client computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
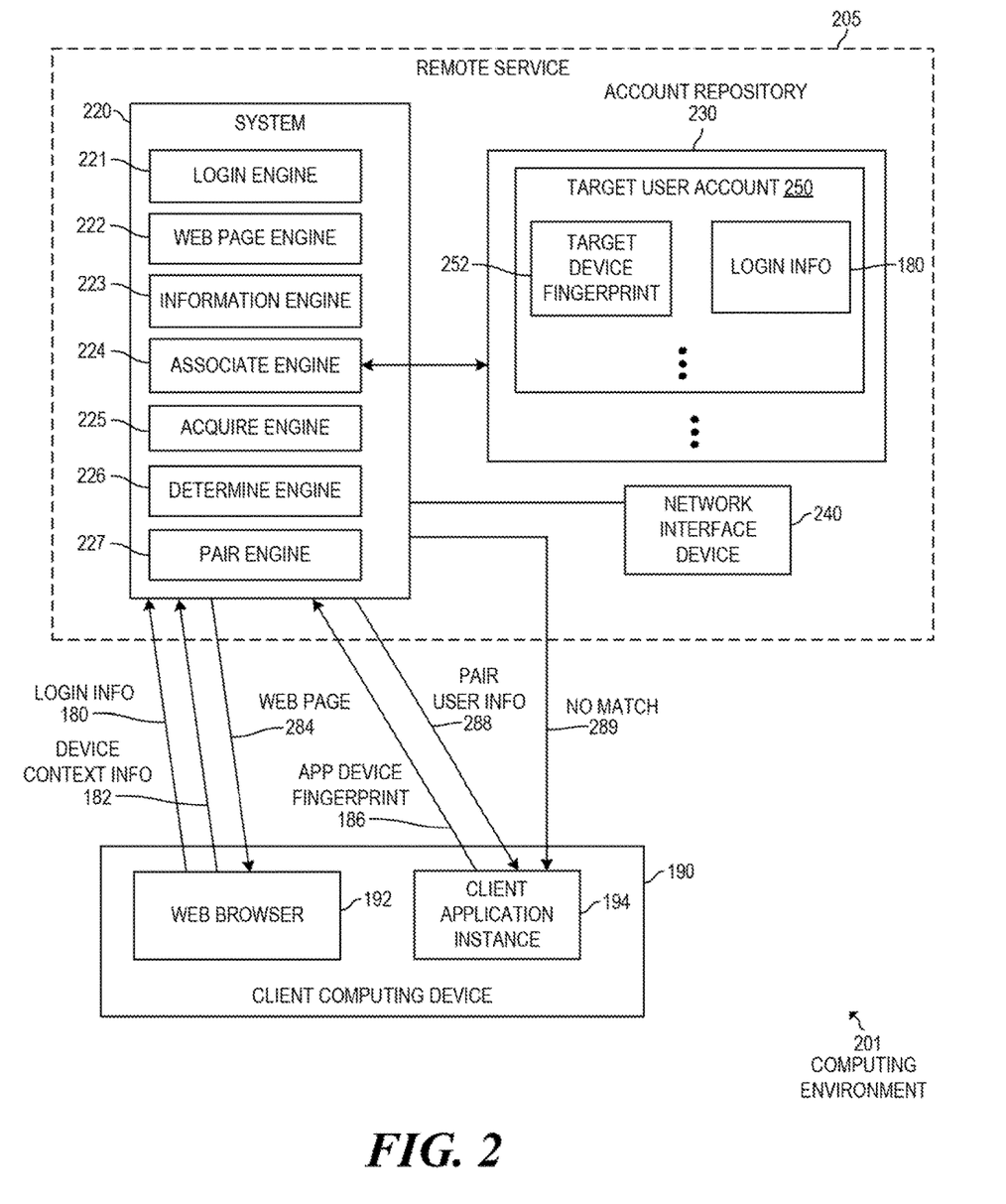
FIG. 2 is a block diagram of an example computing environment including a remote service comprising a system to pair an instance of a client application with a user account without user input.

FIG. 2 is a block diagram of an example computing environment including a remote service 205 comprising a system 220 to pair an instance 194 of a client application with a user account without user input. In the example of FIG. 2, computing environment 201 comprises a remote service 205, and a client computing device 190 including a web browser 192, as described above in relation to FIG. 1. Remote service 205 comprises a system 220, an account repository 230, and a network interface device 240. In the example of FIG. 2, system 220 includes engines 221-227. Remote service 205 may be implemented by one computing device or a plurality of computing devices in communication with one another. In the example of FIG. 2, system 220 may at least partially implement remote service 205. In the example of FIG. 2, engines 221-227 may be implemented on a single computing device, or implementation of the engines 221-227 may be spread across a plurality of different computing devices.

In the example of FIG. 2, client computing device 190 is remote from remote service 205, and system 220 of remote service 205 may utilize network interface device 240 to communicate with client computing device 190 over computer network(s) (e.g., including the Internet). In some examples, at least a portion of system 220 may be implemented on a computing device including network interface device 240. In other examples, system 220 may be implemented by a plurality of computing devices, each including a respective network interface device such as network interface device 240. In some examples, account repository 230 may be at least partially implemented by at least one machine-readable storage medium to store the data of the account repository 230. In such examples, at least one of the computing devices implementing system 220 may include account repository 230, or account repository 230 may be partially implemented by each of a plurality of computing devices implementing system 220, or account repository 230 may be remote from but accessible to computing device(s) implementing system 220.

In the example of FIG. 2, account repository 230 may store information associated with respective user accounts for remote service 205, such as login information for each user account. For example, account repository 230 may store login information 180 associated with target user account 205. In the example of FIG. 2, login engine 221 may acquire login information 180 from a web browser 192 on client computing device 192 and may log in a target user account 250 of remote service 205 based on the login information 180, in response to determining that the acquired login information is matches the login information 180 associated with target user account 250 in the account repository 230. In such examples, engine 221 may log web browser 192 into a target user account 250 of remote service 295 in response to the determination.

In some examples, a user of computing device 190 may access remote service 205 by navigating web browser 192 of client computing device 190 to a web portal of remote service 205 comprising one or more web pages, and may input the login information 180 to one of the web pages via web browser 192, as described above in relation to remote service 105. In such examples, engine 221 may obtain login information 180 from web browser 192.

In some examples, the user logged in to the target user account 250 may select to download a client application via the web portal of remote service 205. For example, at least one of the web pages served by remote service 205 may provide a link or other element that a user may click or otherwise select, via web browser 192, to download a client application, such as a client application for remote service 205 (i.e., useable to access services of remote service 205, such as a dedicated application for that purpose). In such examples, in response to the selection, via web browser 192, of a link (or other element) associated with downloading an instance 194 of the client application, a web page engine 222 may provide, to web browser 192, at least one web page 284 to cause web browser 192 to collect, and provide to remote service 205, device context information 182 for client computing device 190. For example, in response to selection of the link (or other element), engine 222 may serve web page 284 including machine-readable instructions (e.g., JAVASCRIPT code, or the like) that, when executed by web browser 192, may cause web browser 192 to collect piece(s) of device context information from client computing device 190 and return it as device context information 182 to remote service 205.

In some examples, web page engine 222 may serve a plurality of web pages of remote service 205, such as the web pages described above. In some examples, web page engine 222 may be implemented on the same computing device as other engines of system 220, or may be implemented on computing device(s) separate from computing device(s) implementing other engines of system 220.

In the example of FIG. 2, an information engine 223 may acquire, from web browser 192, device context information 182 for client computing device 190. In such examples, web browser 192 may provide device context information 182 based on executing the above-described machine-readable instructions of web page 284. The device context information 182 may be as described above in relation to FIG. 1. In some examples, the device context information 182 acquired from web browser 192 may be device context information 182 for client computing device 190 that is accessible to both web browser 192 when included on (e.g., executing on) client computing device 190) and an instance 194 of the client application when included on (e.g., executing on) the client computing device.

In the example of FIG. 2, associate engine 224 may associate a target device fingerprint 252, that is based on the acquired device context information 182, with the logged in target user account 250 in remote service 205. For example, in response to acquisition of the device context information 182, engine 224 may associate a target device fingerprint 252, that is based on device context information 182, with the target user account 250 that web browser 192 has logged in to. Engine 224 may store target device fingerprint 252 in account repository 230 in association with target user account 250 in any suitable manner. In the example of FIG. 2, login information 180 for target user account 250 and target device fingerprint 252 may both be stored in account repository 230 in association with target user account 250.

In some examples, engine 224 may associate target device fingerprint 252, based on device context information 182, with target user account 250 in any suitable manner as described above in relation to FIG. 1. For example, engine 224 may generate a single-string target device fingerprint 252 based on device context information 182 as described above in relation to FIG. 1 (e.g., by concatenating and hashing device context information 182, or any other suitable method as described above). In other examples, engine 224 may associate each piece of device context information 182 acquired from web browser 192 with target user account 250 as target device fingerprint 252 collectively (e.g., without concatenating the information).

After web browser 192 provides device context information 182 to remote service 205, web page 284 may then enable the client computing device 190 to download an instance 194 of the client application in any suitable manner as described above in relation to FIG. 1. For example, in an example in which engine 224 generates a single-string target device fingerprint 252, web page engine 222 may cause web page 284 to initiate downloading of the instance 194 of the client application by client computing device 190, in response to successful generation of target device fingerprint 252. In other examples, web page 284 may redirect web browser 192 to another web page at which to download instance 194 of the client application, for example.

In the example of FIG. 2, just after instance 194 of the client application is downloaded, instance 194 may be an unpaired instance of the client application, as described above. In such examples, an acquire engine 225 may acquire, from the unpaired instance 194 of the client application, an application device fingerprint 186. The application device fingerprint 186 may be determined by instance 194 of the client application based on device context information 182 for computing device 190 including the instance 194 of the client application. In such examples, application device fingerprint 186 may be determined by instance 194 in the same manner as engine 224 determines target device fingerprint 252 (e.g., to facilitate comparison). For example, when engine 224 generates a single-string fingerprint via concatenation and hashing, instance 194 may generate application device fingerprint 186 in the same manner and based on the same types of device context information. In examples in which engine 224 maintains the pieces of device context information separate in the target device fingerprint 252, instance 194 may do the same for application device fingerprint 186.

In the example of FIG. 2, a determine engine 226 may determine whether the application device fingerprint matches any of a plurality of device fingerprints associated with respective user accounts of remote service 205, in any manner as described above in relation to FIG. 1. For example, engine 226 may compare application device fingerprint 186 to device fingerprints associated with respective user accounts for remote service 105 (which may be stored in the account repository described above) until a device fingerprint that matches the application device fingerprint 186 is found, or until it is determined that none of the stored device fingerprints associated with respective user accounts matches application device fingerprint 186. Engine 226 may determine a match in any suitable manner as described above in relation to FIG. 1.

In the example of FIG. 2, web browser 192 of computing device 190 is used to log in to a web portal of remote service 205 and provides device context information 182 for use in a target device fingerprint 252. Then subsequently an instance 194 of a client application on the same computing device 190 provides an application device fingerprint 186 based on device context information 182 for the client computing device 190 to remote service 205. In such examples, determination engine 226 may determine that the target device fingerprint 252 and the application device fingerprint 186 match. In such examples, the device context information for client computing device 190 accessed and returned by web browser 192 may be the same as the device context information accessed by instance 194, since web browser 192 and instance 194 determine the device context information from the same computing device (and likely near in time). As such, the target device fingerprint 252 and the application device fingerprint 186 may match in the example of FIG. 2, which, in some examples, indicates that instance 194 may be paired with the target user application without user input (e.g., input of login information to instance 194).

In such examples, in response to a determination that application device fingerprint 186 matches target device fingerprint 252 associated with target user account 250, engine 227 may pair the instance 194 of the client application with target user account 250 based on the acquired application device fingerprint 186 and without user input, as described above in relation to FIG. 1. In some examples, engine 227 may provide, to the instance 194 of the client application, at least one piece of information 288 associated with target user account 250 in remote service 205, to pair the instance 194 of the client application with target user account 250 without user input of any login information to the instance 194 of the client application via client computing device 190. In some examples, the at least one piece of information provided may be at least one piece of login information 180 (e.g., username, email address, etc.) associated with target user account 250.

In other examples, in which an instance of the client application is downloaded on a computing device which had not previously been used to log in to remote service 205 with a browser of the computing device, then the application device fingerprint acquired from the instance of the client application may not match any device fingerprint associated with any user account of remote service 205. In such examples, engine 226 may determine that the application device fingerprint does not match any of a plurality of device fingerprints associated with respective user accounts of remote service 205. In such examples, in response to a determination that the application device fingerprint does not match any of a plurality of device fingerprints associated with user accounts of remote service 205, pair engine 227 may provide, to the instance of the client application, information 289 to cause the instance of the client application to display a prompt to receive input of login information for remote service 205 via the client computing device, as described above in relation to FIG. 1.

In examples described herein, multiple device fingerprints may be associated with a single user account (e.g., in an account repository) for a remote service, as multiple different computing devices may be used to log in to the remote service with a web browser. In such examples, the functionalities described above may be performed for each of a plurality of instances of the client application on different computing devices to pair the respective instances without user input as described above.

Each of engines 221-227 of system 220 may be any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 221-227. In such examples, system 220 may include the machine-readable storage medium storing the instructions and the processing resource to execute the instructions, or the machine-readable storage medium may be separate but accessible to system 220 and the processing resource.

In some examples, the instructions can be part of an installation package that when installed, can be executed by the processing resource to implement at least engines 221-227. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 220 including the processing resource. In such examples, the machine-readable storage medium may include memory such as a hard drive, solid state drive, or the like. In other examples, the functionalities of any engines of system 220 may be implemented in the form of electronic circuitry. In some examples, functionalities described herein in relation to FIG. 2 may be provided in combination with functionalities described herein in relation to any of FIGS. 1, 3, and 4.

Figures 3, 4:
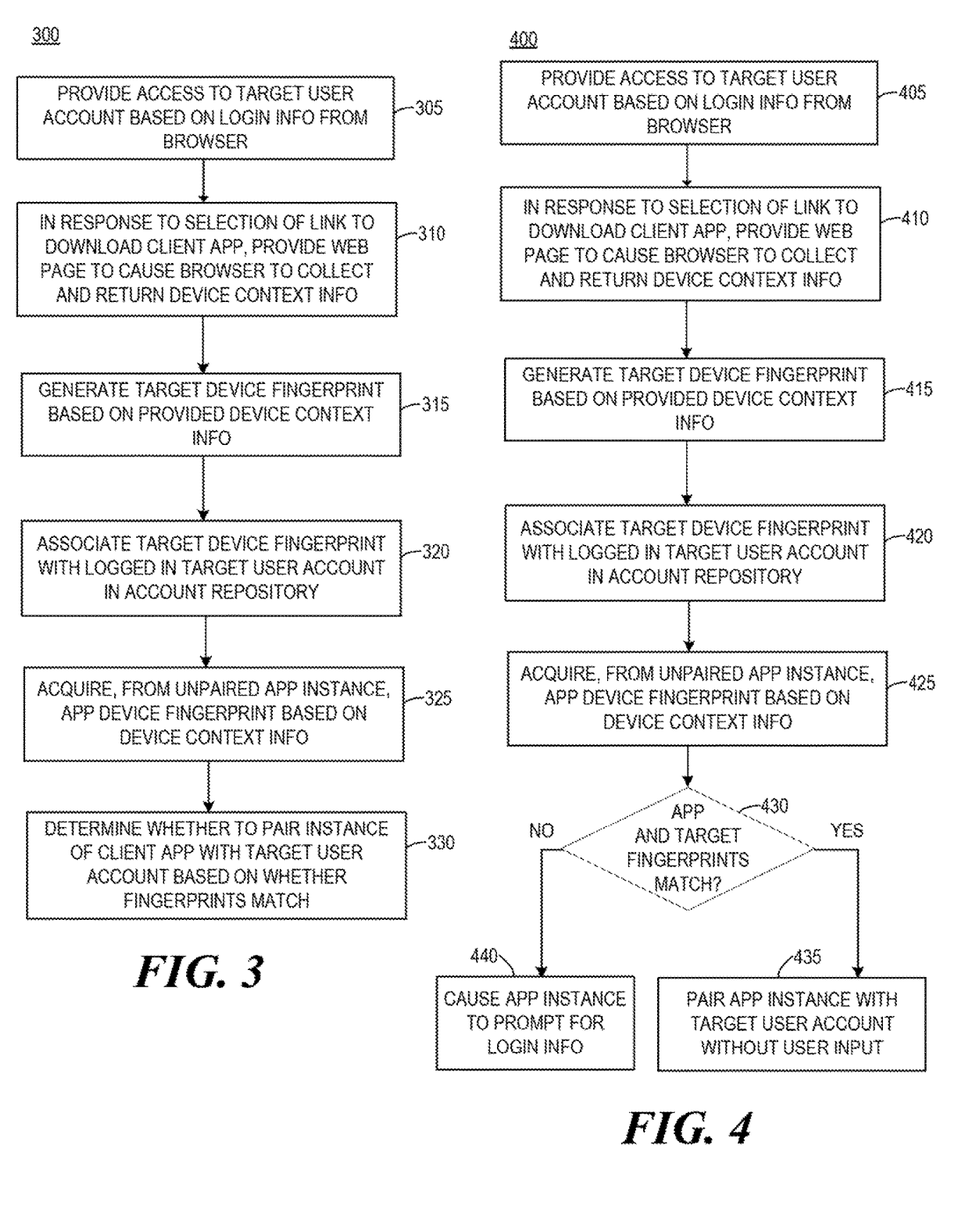
FIG. 3 is a flowchart of an example method for pairing an instance of a client application with a user account the based on an application device fingerprint and without user input.
FIG. 4 is a flowchart of an example method for acquiring an application device fingerprint determined by an unpaired instance of a client application based on device context information.

FIG. 3 is a flowchart of an example method 300 for pairing an instance of a client application with a user account the based on an application device fingerprint and without user input. Although execution of method 300 is described below with reference to system 220 of FIG. 2 described above, other suitable systems or devices for the execution of method 300 can be utilized (e.g., computing device 100). Additionally, implementation of method 300 is not limited to such examples.

At 305 of method 300, login engine 221 may provide a web browser 192 access to target user account 250 of remote service 205 based on account login information 180 acquired from web browser 192 of client computing device 190. At 310, in response to selection (via the web browser 192) of a link associated with downloading an instance of a client application, web page engine 222 may provide to web browser 192 at least one web page 284 to cause web browser 192 to collect, and provide to remote service 205, device context information 182 for client computing device 190, as described above. In such examples, information engine 223 may acquire the device context information 182 from web browser 192.

At 315, associate engine 224 may generate, with a processing resource of remote service 205, a target device fingerprint 252 based on the device context information 182 for client computing device 190 provided to remote service 205 by web browser 192. Engine 224 may generate a target device fingerprint 252 in any suitable manner as described above. At 320, engine 224 may associate target device fingerprint 252 with the logged in target user account 250 in account repository 230 of remote service 205.

At 325, acquire engine 225 may acquire, from an unpaired instance 194 of the client application, an application device fingerprint 186 determined by the instance 194 of the client application based on device context information for a computing device including the Instance 194 of the client application. At 330, a determine engine 226 may determine whether to pair the instance 194 of the client application with target user account 250, without user input, based on whether application device fingerprint 186 matches target device fingerprint 252, as described above in relation to FIGS. 1 and 2.

In examples described herein, the engines of system 220 may communicate with client computing device 190, and other computing devices remote from the remote service 205, via at least one network interface of remote service 205 (e.g., network interface 240). Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1, 2, and 4.

FIG. 4 is a flowchart of an example method 400 for acquiring an application device fingerprint determined by an unpaired instance of a client application based on device context information. Although execution of method 400 is described below with reference to system 220 of FIG. 2 (described above), other suitable systems or devices for the execution of method 400 can be utilized (e.g., computing device 100). Additionally, implementation of method 400 is not limited to such examples.

At 405 of method 400, login engine 221 may provide a web browser 192 access to target user account 250 of remote service 205 based on account login information 180 acquired from web browser 192 of client computing device 190. At 410, in response to selection (via the web browser 192) of a link associated with downloading an instance of a client application, web page engine 222 may provide to web browser 192 at least one web page 284 to cause web browser 192 to collect, and provide to remote service 205, device context information 182 for client computing device 190, as described above. In such examples, information engine 223 may acquire the device context information 182 from web browser 192.

At 415, associate engine 224 may generate, with a processing resource of remote service 205, a target device fingerprint 252 based on the device context information 182 for client computing device 190 provided to remote service 205 by web browser 192. Engine 224 may generate a target device fingerprint 252 in any suitable manner as described above. At 420, engine 224 may associate target device fingerprint 252 with the logged in target user account 250 in account repository 230 of remote service 205.

At 425, acquire engine 225 may acquire, from an unpaired instance 194 of the client application, an application device fingerprint 186 determined by the instance 194 of the client application based on device context information for a computing device including the instance 194 of the client application. At 430, a determine engine 226 may determine whether to pair the instance 194 of the client application with target user account 250, without user input, based on whether application device fingerprint 186 matches target device fingerprint 252, as described above in relation to FIGS. 1 and 2.

In response to a determination that the application device fingerprint 252 matches the target device fingerprint, pair engine 227 may, at 435, provide, to the instance 194 of the client application, at least one piece of information 288 associated with target user account 250 in remote service 205 to pair the instance 194 of the client application with target user account 250 without user input of any login information to the instance 194 of the client application via client computing device 190. In some examples, the at least one piece of information provided may be at least one piece of login information 180 (e.g., username, email address, etc.) associated with target user account 250.

In response to a determination that the application device fingerprint 252 does not match any of a plurality of device fingerprints associated with user accounts of remote service 205, pair engine 227 may, at 440, provide, to the instance 194 of the client application, information 289 to cause the instance 194 of the client application to display a prompt to receive input of login information for remote service 205 via client computing device 190.

In examples described herein, the engines of system 220 may communicate with client computing device 190, and other computing devices remote from the remote service 205, via at least one network interface of remote service 205 (e.g., network interface 240). Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by a processing resource of a remote service to:
   acquire, from a web browser on a client computing device, login information for a target user account of the remote service;
   log the target user account into the remote service at the web browser, based on the acquired login information acquired from the web browser;
   acquire, from the web browser, device context information for the client computing device;
   associate a target device fingerprint, based on the acquired device context information, with the target user account in the remote service;
   in response to successful association of the target device fingerprint, cause the web browser to initiate downloading of a client application for the remote service for execution on the client computing device, the client application different than the web browser;
   acquire, from the downloaded and executed client application on the client computing device and for the remote service, an application device fingerprint determined by the client application based on device context information for the client computing device computing device including the client application, the target user account of the remote service not currently logged into at the client application, preventing access of the target user account of the remote service at the client application without first logging into the target user account of the remote service at the client application;
   in response to a determination that the application device fingerprint matches the target device fingerprint, pair the client application on the client computing device with the target user account based on the acquired application device fingerprint and without user input, permitting access of the target user account of the remote service at the client application on the client computing device without user input to log into the target user account of the remote service at the client application; and
   in response to a determination that the application device fingerprint does not match any of a plurality of device fingerprints associated with user accounts of the remote service, provide, to the client application, information to cause the client application to display a prompt for input of login information for the remote service via the client computing device.

2. The article of claim 1, wherein the device context information acquired from the web browser is device context information that would be accessible to the client application when included on the client computing device.

3. The article of claim 1, wherein the instructions to pair comprise instructions to:
   provide, to the client application, at least one piece of information associated with the target user account in the remote service to pair the client application with the target user account.

4. The article of claim 1, wherein the instructions to pair comprise instructions to:
   pair the client application with the target user account without user input of any login information to the client application.

5. The article of claim 1, wherein the instructions to pair comprise instructions to:
   compare the application device fingerprint to device fingerprints associated with respective user accounts of the remote service.

6. A system comprising:
   a processor; and
   a memory storing instructions to implement a remote service and executable by the processor to:
   acquire, from a web browser on a client computing device, login information for a target user account of the remote service;
   log the target user account into the remote service at the web browser, based on the acquired login information acquired from the web browser;
   acquire, from the web browser, device context information for the client computing device;
   associate a target device fingerprint, based on the acquired device context information, with the target user account in the remote service;
   in response to successful association of the target device fingerprint, cause the web browser to initiate downloading of a client application for the remote service for execution on the client computing device, the client application different than the web browser;
   acquire, from the downloaded and executed client application on the client computing device and for the remote service, an application device fingerprint determined by the client application based on device context information for the client computing device computing device including the client application, the target user account of the remote service not currently logged into at the client application, preventing access of the target user account of the remote service at the client application without first logging into the target user account of the remote service at the client application;

in response to a determination that the application device fingerprint matches the target device fingerprint, pair the client application on the client computing device with the target user account based on the acquired application device fingerprint and without user input, permitting access of the target user account of the remote service at the client application on the client computing device without user input to log into the target user account of the remote service at the client application; and in response to a determination that the application device fingerprint does not match any of a plurality of device fingerprints associated with user accounts of the remote service, provide, to the client application, information to cause the client application to display a prompt for input of login information for the remote service via the client computing device.

7. The system of claim 6, wherein the device context information acquired from the web browser is device context information that would be accessible to the client application when included on the client computing device.

8. The system of claim 6, wherein instructions are executable by the processor to further:

provide, to the client application, at least one piece of information associated with the target user account in the remote service to pair the client application with the target user account.

9. The system of claim 6, wherein the instructions are executable by the processor to further:

pair the client application with the target user account without user input of any login information to the client application.

10. The system of claim 6, wherein the instructions are executable by the processor to further:

compare the application device fingerprint to device fingerprints associated with respective user accounts of the remote service.

11. A method comprising:

acquiring, from a web browser on a client computing device, login information for a target user account of a remote service;

logging the target user account into the remote service at the web browser, based on the acquired login information acquired from the web browser;

acquiring, from the web browser, device context information for the client computing device;

associating a target device fingerprint, based on the acquired device context information, with the target user account in the remote service;

in response to successful association of the target device fingerprint, causing the web browser to initiate downloading of a client application for the remote service for execution on the client computing device, the client application different than the web browser;

acquiring, from the downloaded and executed client application on the client computing device and for the remote service, an application device fingerprint determined by the client application based on device context information for the client computing device computing device including the client application, the target user account of the remote service not currently logged into at the client application, preventing access of the target user account of the remote service at the client application without first logging into the target user account of the remote service at the client application;

in response to a determination that the application device fingerprint matches the target device fingerprint, pairing the client application on the client computing device with the target user account based on the acquired application device fingerprint and without user input, permitting access of the target user account of the remote service at the client application on the client computing device without user input to log into the target user account of the remote service at the client application; and in response to a determination that the application device fingerprint does not match any of a plurality of device fingerprints associated with user accounts of the remote service, providing, to the client application, information to cause the client application to display a prompt for input of login information for the remote service via the client computing device.

12. The method of claim 11, wherein the device context information acquired from the web browser is device context information that would be accessible to the client application when included on the client computing device.

13. The method of claim 11, further comprising:

providing, to the client application, at least one piece of information associated with the target user account in the remote service to pair the client application with the target user account.

14. The method of claim 11, further comprising:

pairing the client application with the target user account without user input of any login information to the client application.

15. The method of claim 11, further comprising:

comparing the application device fingerprint to device fingerprints associated with respective user accounts of the remote service.

* * * * *